United States Patent
Watanabe et al.

(10) Patent No.: US 7,421,328 B2
(45) Date of Patent: Sep. 2, 2008

(54) VEHICLE SLIP STATE DETERMINATION SYSTEM AND TRAVELING STATE CONTROL SYSTEM

(75) Inventors: Takashi Watanabe, Kariya (JP); Yasuhiro Abe, Kariya (JP); Ken Kudo, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 675 days.

(21) Appl. No.: 10/934,438

(22) Filed: Sep. 7, 2004

(65) Prior Publication Data

US 2006/0052927 A1  Mar. 9, 2006

(51) Int. Cl.
*G05D 1/06* (2006.01)

(52) U.S. Cl. .............................. 701/71; 701/79; 701/89; 180/197; 180/248

(58) Field of Classification Search .............. 701/70–71, 701/79, 89; 180/197, 248; 303/113.1
See application file for complete search history.

(56) References Cited

U.S. PATENT DOCUMENTS

| | | | | |
|---|---|---|---|---|
| 4,912,641 | A | * | 3/1990 | Kuwana et al. ................ 701/79 |
| 4,959,590 | A | * | 9/1990 | Hatada et al. ............. 315/169.3 |
| 4,991,103 | A | * | 2/1991 | Lin .............................. 701/73 |
| 5,011,236 | A | * | 4/1991 | Toepfer et al. ................ 303/198 |
| 5,407,023 | A | * | 4/1995 | Yamashita et al. ............ 180/197 |
| 5,497,333 | A | * | 3/1996 | Sasaki ........................... 701/72 |
| 5,519,615 | A | * | 5/1996 | Schob et al. ................... 701/70 |
| 5,567,024 | A | * | 10/1996 | Johnson ........................ 303/158 |

(Continued)

FOREIGN PATENT DOCUMENTS

JP  A-7-159308  6/1995

(Continued)

OTHER PUBLICATIONS

An anti-lock braking control system for a hybrid electromagnetic/electrohydraulic brake-by-wire system; Anwar, S.; American Control Conference, 2004. Proceedings of the 2004; vol. 3, Jun. 30-Jul. 2, 2004 pp. 2699-2704 vol. 3 □□.*

(Continued)

*Primary Examiner*—Cuong H Nguyen
(74) *Attorney, Agent, or Firm*—Posz Law Group, PLC

(57) ABSTRACT

A vehicle slip state determination system serves to calculate an estimated vehicle speed VB, an estimated vehicle deceleration in the vehicle speed DVB, and each of wheel speed differences between right front and rear wheels and between left front and rear wheels ΔVR, ΔVL, respectively. The wheel speed difference ΔVR, ΔVL are divided into three ranges, that is, range 1, range 2, and range 3 by the speed difference upper and lower limit values JVUP and JVLO, each of which is a linear function value with respect to the estimated vehicle deceleration DVB. In the ranges 1 and 3, the vehicle traveling on the road with the low friction coefficient μ is brought into the slip state where four wheels are slipped. If the wheel speed difference at a predetermined estimated vehicle deceleration deviates from a determination range defined by the upper and lower limit values, the slip state of the vehicle, that is, the condition where the vehicle is traveling on the road with the low friction coefficient μ is determined.

15 Claims, 7 Drawing Sheets

U.S. PATENT DOCUMENTS

| | | | |
|---|---|---|---|
| 5,731,976 A * | 3/1998 | Tsuyama et al. | 701/84 |
| 6,212,461 B1 * | 4/2001 | Ghoneim et al. | 701/70 |
| 6,431,663 B1 * | 8/2002 | Fennel et al. | 303/147 |
| 6,549,840 B1 * | 4/2003 | Mikami et al. | 701/69 |
| 6,595,600 B2 * | 7/2003 | Banno et al. | 303/113.5 |
| 2003/0195690 A1 * | 10/2003 | Batistic et al. | 701/72 |
| 2006/0052927 A1 * | 3/2006 | Watanabe et al. | 701/71 |
| 2008/0021626 A1 * | 1/2008 | O'Dea et al. | 701/80 |

FOREIGN PATENT DOCUMENTS

| | | |
|---|---|---|
| JP | A-10-006964 | 1/1998 |
| JP | 2006283591 A * | 10/2006 |
| JP | 2007297023 A * | 11/2007 |

OTHER PUBLICATIONS

Electronic control unit for passenger car antiskid; Leiber, H.; Czinczel, A.; Vehicular Technology Conference 1979. 29th IEEE vol. 29, Mar. 27-30, 1976 pp. 65-69 .*

A novel brake control strategy for electric vehicles based on slip trial method; Zhou Lei; Luo Yugong; Yang Diange; Li Keqiang; Lian Xiaomin; Vehicular Electronics and Safety, 2007. ICVES. IEEE International Conference on; Dec. 13-15, 2007 pp. 1-6 Digital Object Identifier 10.1109/ICVES.2007.4456364.*

A brief review of air brake wheel lock control systems; Jones, T.O.; Bonvallet, D.J.; Vehicular Technology Conference, 1978. 28th IEEE; vol. 28, Mar. 22-24, 1978 pp. 236-240 .*

Cooperative Redundant Steering/Drive System: Mechatronics Correction for Slip Angles and Longitudinal Slip; Spark, I.J.; Ibrahim, M.Y.; Industrial Electronics, 2006 IEEE International Symposium on; vol. 4, Jul. 2006 pp. 3026-3031 Digital Object Identifier 10.1109/ISIE.2006.296098.*

Slip Angles and Longitudinal Slip Measurement of the Cooperative Redundant Steering/Drive System; Spark, I.J.; Ibrahim, M.Y.; Mechatronics, 2006 IEEE International Conference on; July 2006 pp. 451-456; Digital Object Identifier 10.1109/ICMECH.2006.252569.*

Performance evaluation of antilock brake controller for pneumatic brake system; Ki-Chang Lee; Jeong-Woo Jeon; Don-Ha Hwang; Yong-Joo Kim; Industry Applications Conference, 2003. 38th IAS Annual Meeting. Conference Record of the vol. 1, Oct. 12-16, 2003 pp. 301-307 vol. 1.*

3D-odometry for rough terrain—towards real 3D navigation; Lamon, P.; Siegwart, R.; Robotics and Automation, 2003. Proceedings. ICRA '03. IEEE International Conference on ; vol. 1, Sep. 14-19, 2003 pp. 440-445.*

Calculating longitudinal wheel slip and tire parameters using GPS velocity; Miller, S.L.; Youngberg, B.; Millie, A.; Schweizer, P.; Gerdes, J.C.; American Control Conference, 2001. Proceedings of the 2001; vol. 3, Jun. 25-27, 2001 pp. 1800-1805 vol. 3; Digital Object Identifier 10.1109/ACC.2001.945995.*

Autonomous underground navigation of an LHD using a combined ICP-EKF approach; Madhavan, R.; Dissanayake, M.W.M.G.; Durrant-Whyte, H.F.; Robotics and Automation, 1998. Proceedings. 1998 IEEE International Conference on; vol. 4, May 16-20, 1998 pp. 3703-3708 vol. 4; Digital Object Identifier 10.1109/ROBOT.1998. 681413.*

* cited by examiner

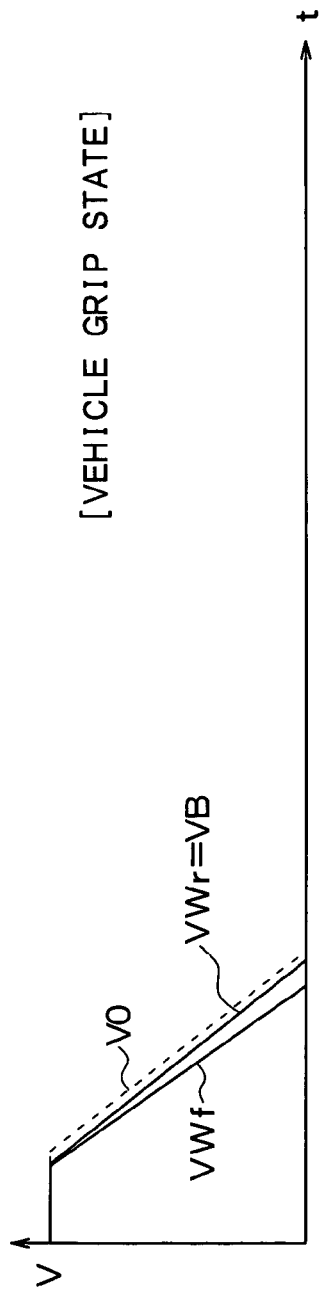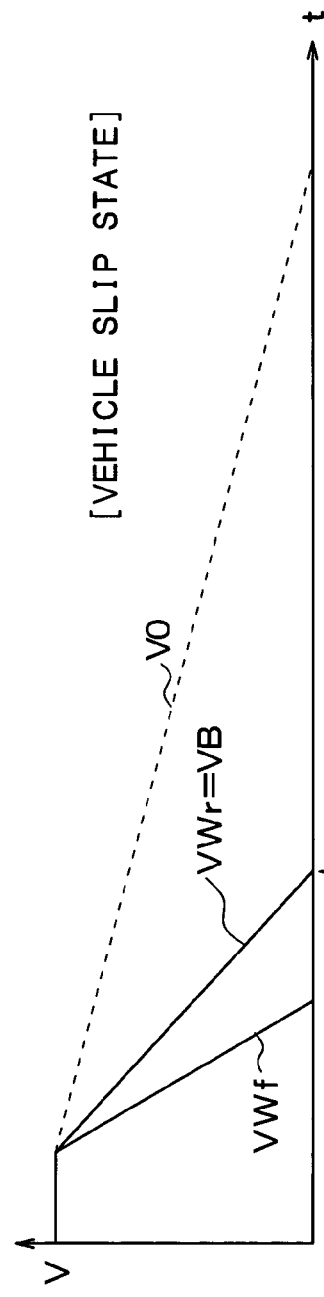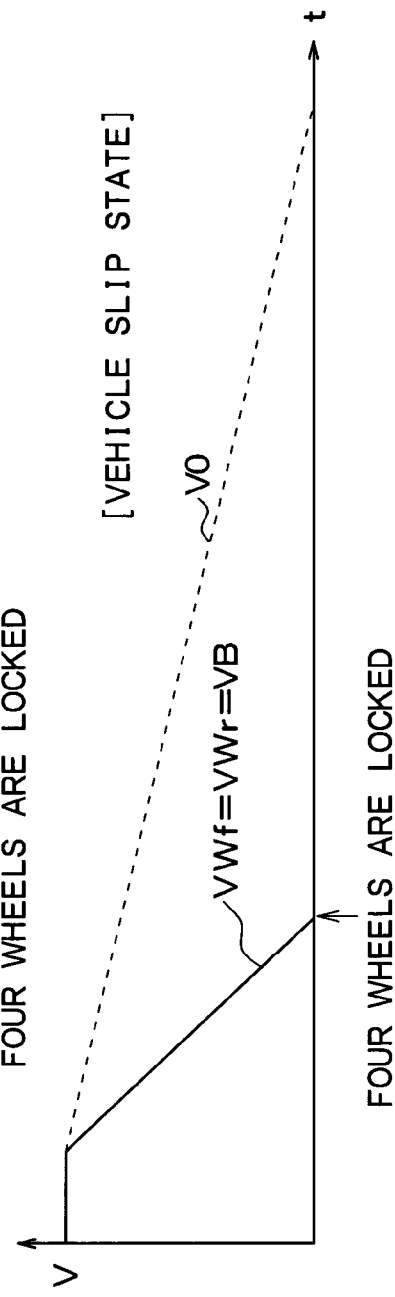

VEHICLE SLIP STATE DETERMINATION SYSTEM AND TRAVELING STATE CONTROL SYSTEM

FIELD OF THE INVENTION

The present invention relates to a vehicle slip state determination system that determines a slip state of a vehicle, and is preferably applicable to a four-wheel-drive vehicle, an anti-lock brake control system (hereinafter referred to as ABS control system), a traction control system and the like.

BACKGROUND OF THE INVENTION

A vehicle equipped with an ABS control system has been generally designed to be controlled on the assumption that the front wheel is locked prior to the rear wheel. Japanese Patent Application Laid-Open Hei 7-159308 discloses that the wheel speed difference between the front and rear wheels is calculated, and a friction coefficient μ on the road surface is estimated based on a time gradient obtained when the change ratio of the wheel speed difference becomes equal to or larger than a predetermined value. The ABS control operation is executed based on the resultant friction coefficient μ.

In the case where the friction coefficient μ of the road surface is small, each wheel speed of the four wheels may be reduced simultaneously contrary to the assumption that the front wheel is locked prior to the rear wheel. The ABS control serves to estimate the vehicle speed based on the higher value of the wheel speed selected among those of the four wheels. The current slip ratio is derived from the estimated vehicle speed so as to be controlled into the required slip ratio. In the case where the wheel is brought into the slip state without generating the wheel speed difference between the front and rear wheels as described above, the vehicle speed cannot be estimated, thus failing to determine the slip state of the vehicle.

In the case where the four-wheel-drive vehicle is traveling on the road with a considerably low friction coefficient μ, the small reaction force on the road surface is overcome by the force that functions in restricting the four wheels or front and rear wheels. The wheel speeds of those four wheels, thus, are reduced simultaneously.

In the case where the two-wheel-drive vehicle is traveling on the road with a considerably low friction coefficient μ, the force that functions in restricting the front and rear wheels is small. Then the front wheels become likely to be locked, and the rear wheels become likely to be locked thereafter. The rear wheel speed tends to be reduced at an earlier stage far deviated from the vehicle speed. The vehicle speed is estimated on the assumption as being equal to the highest wheel speed selected among those of the four wheels, that is, the rear wheel speed in spite of the low deceleration in the actual vehicle speed. It is not practical to execute the ABS control using the slip ratio derived from the estimated vehicle speed far deviated from the actual value.

Meanwhile Japanese Patent Application Laid-Open Hei 10-6964 discloses a system which determines that all the wheels of the four-wheel-drive vehicle are locked if the estimated vehicle deceleration exceeds a predetermined value and the difference in the rotating speeds between the front and rear axles is within a predetermined range.

The system disclosed in the aforementioned publication is capable of determining the lock state of all the four wheels of the vehicle traveling on the road with the specific friction coefficient μ. The system, however, is not capable of determining the slip state of all the four wheels prior to the determination of the lock state of those wheels.

SUMMARY OF THE INVENTION

It is an object of the present invention to determine a slip state of four wheels of the vehicle prior to the determination of the lock state thereof.

According to a first aspect of the present invention, a wheel speed difference between front and rear wheels, which is equal to or larger than a speed difference lower limit value is considered as being within a determination range. If the wheel speed difference deviates from the determination range, that is, smaller than the lower limit value, it may be determined that the vehicle is in the slip state. Accordingly the state where four wheels of the vehicle are brought into the slip state without generating the wheel speed difference may be reliably determined before those four wheels are locked. As the lower limit value that defines the determination range is set in accordance with the braking state, the determination range can be changed as the braking state varies. The slip state of the vehicle, thus, can be accurately determined.

The lower limit value is set in accordance with the deceleration in the vehicle speed, for example.

The lower limit value may be set to be increased with an increase in the deceleration. Alternatively the lower limit value may be set as a linear function value with respect to the deceleration.

According to a second aspect of the present invention, the determination range defined by the lower limit value and the upper limit value larger than the lower limit value each as the predetermined value in accordance with the braking state is set. If the deceleration deviates from the determination range, that is, the deceleration is smaller than the lower limit value, or the deceleration is larger than the upper limit value, it may be determined that the vehicle is in the slip state. It is capable of determining the slip state of the vehicle accurately, which may be caused under various braking states.

Like the lower limit value, the upper limit value may be set to be increased with the increase in the deceleration. Alternatively, the upper limit value may be set as a linear function value with respect to the deceleration.

According to the third aspect of the present invention, the wheel speed difference between left front and rear wheels and the wheel speed difference between right front and rear wheels are obtained at a predetermined time interval. Then it is determined whether or not the wheel speed difference between right and left front and rear wheels are within the determination range. The frequency of the operation in which at least one of the wheel speed differences between right and left front and rear wheels deviates from the determination range is calculated. Another frequency of the operation in which both the wheel speed differences between right and left front and rear wheels are within the determination range is calculated. Then the difference between the thus calculated values of the frequency is obtained. When the obtained difference exceeds a predetermined value, it is determined that the vehicle is in the slip state. Even in the condition where the magnitude of the wheel speed difference between front and rear wheels changes owing to the change in the road surface condition, braking state of the vehicle and the like, the slip state of the vehicle may be stably determined.

The determination range is set in accordance with the deceleration in the vehicle speed indicating the braking state.

BRIEF DESCRIPTION OF THE DRAWINGS

Other objects, features and advantages of the present invention will be understood more fully from the following detailed description made with reference to the accompanying drawings. In the drawings:

FIG. 2A is a view that shows a change in the grip state of the vehicle in a range 2 with respect to time;

FIG. 2B is a view that shows a change in the slip state of the vehicle in a range 1 with respect to time;

FIG. 2C is a view that shows a change in the slip state of the vehicle in a range 3 with respect to time;

DETAILED DESCRIPTION OF THE PREFERRED EMBODIMENTS

Figure 1:
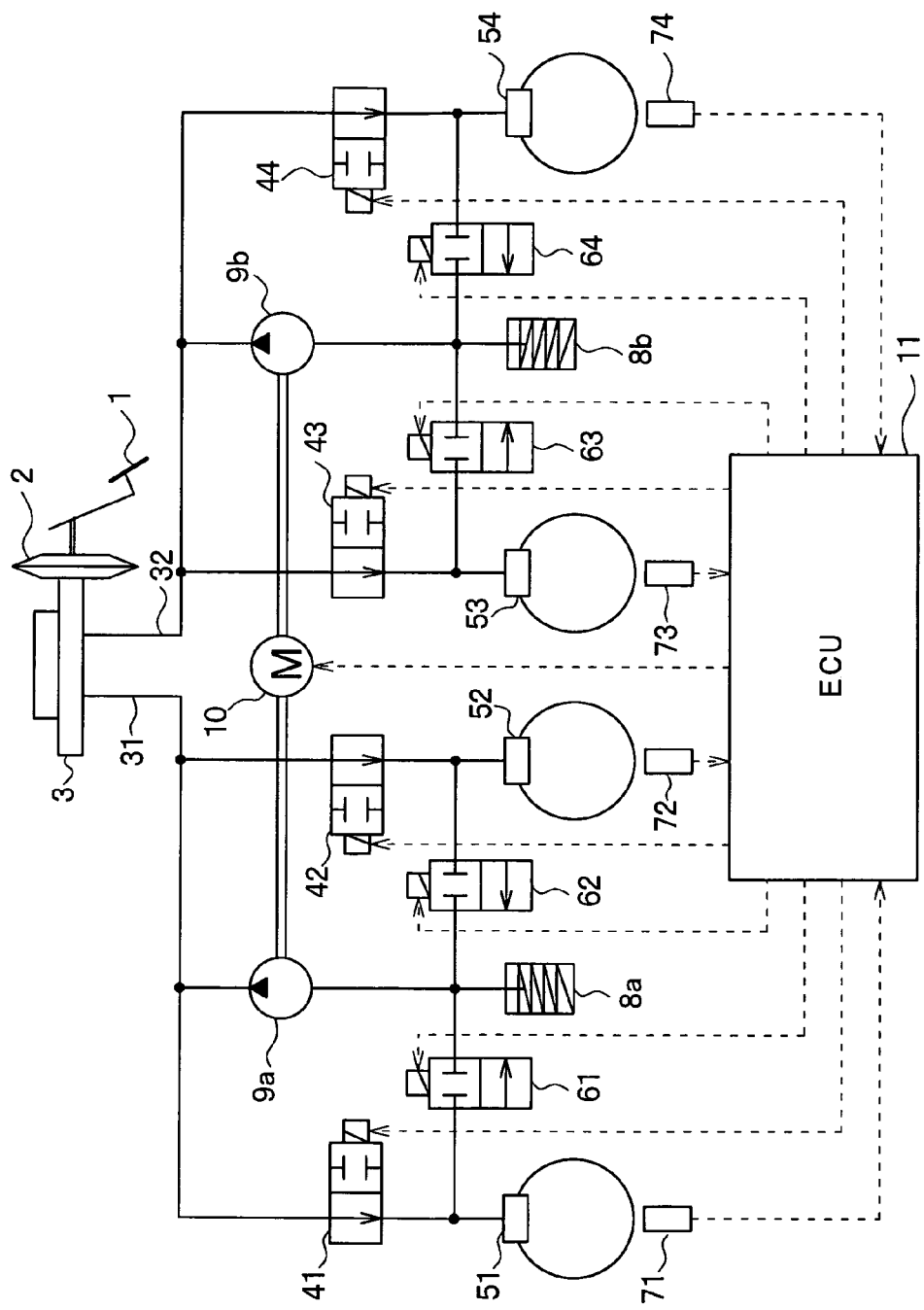
FIG. 1 is a schematic view that shows a structure of a brake unit according to an embodiment of the present invention.

The present invention will be described further with reference to various embodiments in the drawings.

An embodiment structured by applying a vehicle slip determination system of the present invention will be described referring to the drawings. FIG. 1 is a schematic view that shows a structure of a brake unit of the embodiment.

Referring to FIG. 1, a brake pedal 1 is connected to a master cylinder (hereinafter referred to as M/C) 3 via a servo unit 2 such that hydraulic pressure is generated upon depression of the brake pedal 1. The generated hydraulic pressure is supplied to each of wheel cylinders (hereinafter W/C) 51, 52, 53 and 54 respectively provided on the wheels (left front wheel FL, right front wheel FR, left rear wheel RL, and right rear wheel RR) via a first brake system 31 and a second brake system 32 each connected to the M/C 3 as an X piping. The structure of the first brake system is the same as that of the second brake system 32. Accordingly the structure of the brake systems 31, 32 will be described referring to the first brake system 31.

Pressure increase control valves 41, 42 are provided between the M/C 3 and the W/C 51, and between the M/C 3 and the W/C 52, respectively. Each of the pressure increase control valves 41, 42 are structured as a two position valve of normally open type, open and close states of which are controlled by an electronic control unit (hereinafter referred to as ECU) 11. When those pressure increase control valves 41, 42 are controlled in the open state, the flow of the brake fluid serves to increase the brake fluid pressure of the W/C 51, 52, respectively. During the normal braking operation without execution of the ABS control, those pressure increase control valves 41, 42 are controlled into the normal open state.

Conduits are connected between the pressure increase control valve 41 and the W/C 51, and between the pressure increase control valve 42 and the W/C 52, respectively, which are connected to a reservoir 8a. Pressure decrease control valves 61, 62 of normally close type are provided on the conduits between the W/C 51, 52 and the reservoir 8a, respectively such that the open and close states thereof are controlled by the ECU 11. When the aforementioned two position valve is controlled into the open state, the brake fluid is discharged into the reservoir 8a by the W/C 51, 52, reducing each of the W/C pressures thereof. The pressure decrease control valves 61, 62 are normally in the close state during the normal braking operation.

A rotary pump 9a is provided on the conduit that connects the M/C 3 and the reservoir 8a. The rotary pump 9a is connected to a motor 10 controlled by the ECU 11 so as to be driven thereby.

Wheel speed sensors 71, 72 are provided on each of the wheels such that a detection signal corresponding to the wheel speed is output to the ECU 11.

The ECU 11 receives detection signals from the respective pressure sensors (not shown) each detecting the pressure in the respective portion of the brake system, or detection signals from the wheel speed sensors 71, 72. The ECU 11 serves to execute various calculations with respect to the vehicle speed, deceleration, and vehicle slip determination as well as drive signals in various portions under the ABS control based on the aforementioned received detection signals. Based on the calculation results, electromagnetic valves 41, 42, 61, 62 are operated, and drive of the motor 10 is controlled.

The structure of the second brake system 32 is identical to that of the first brake system 31. More specifically, pressure increase control valves 43, 44 correspond to the pressure increase control valves 41, 42, and W/C 53, 54 correspond to the W/C 51, 52. Pressure decrease control valves 63, 64 correspond to the pressure decrease control valves 61, 62, a reservoir 8b corresponds to the reservoir 8a, and a rotary pump 9b corresponds to the rotary pump 9a, respectively. Each wheel connected to the second brake system 32 is provided with wheel speed sensors 73, 74 corresponding to the wheel speed sensors 71, 72 of the first brake system 31. As functions of the aforementioned elements are identical to those of the first brake system 31, each description thereof, thus, will be omitted.

Determination with respect to the vehicle slip state executed by the ECU 11 will be hereinafter described. The vehicle slip state in the present embodiment will be described. The vehicle slip state refers to the slip state of the vehicle caused by the difference between the wheel speed of the respective wheels and the actual vehicle speed during braking operation, that is, the state that may bring all the four wheels into the lock state. In this case, if the slip state of those four wheels is continued, they may be brought into the lock state (slip ratio=100%). The slip ratio herein refers to the ratio of the difference between the actual vehicle speed and the wheel speed.

The vehicle grip state refers to the state in which at least one of those wheels is in the grip state.

FIGS. 2A to 2C show examples of each change in wheel speeds of the front and rear wheels VWf, VWr during braking operation, estimated vehicle speed VB, and actual vehicle speed V0 with respect to time. A maximum value of the wheel speed among those of the respective wheels is selected as the estimated vehicle speed VB as described below.

FIG. 2A represents an example of the vehicle grip state when the braking force is applied to a front-wheel-drive vehicle traveling on the road with a relatively higher friction coefficient at a middle or higher level. In this case, the front wheels are slightly in the slip state, and the rear wheels are gripped. The estimated vehicle speed VB is set at the value corresponding to the highest wheel speed among those of the respective wheels. Accordingly the wheel speed VWr of the rear wheel as the rolling wheel is equal to the estimated vehicle speed VB. The actual vehicle speed V0 is substantially equal to the estimated vehicle speed VB. The wheel speeds VWf, VWr, and the actual vehicle speed V0 become 0 almost simultaneously. Then the vehicle is stopped without bringing those four wheels into the lock state.

In this case, the front wheel speed VWf is set to be lower than the rear wheel speed VWr so as to prevent the vehicle behavior from being instable when the rear wheels are brought into the lock state prior to the front wheels. The difference between the front wheel speed VWf and the rear wheel speed VWr is set to be within the range defined by the maximum and the minimum values such that the difference becomes small sufficient to maintain the total braking efficiency of both the front and the rear wheels. Under the aforementioned control operation while holding the grip state to a certain degree, the wheel speed difference between the front and rear wheels is restrained to be relatively small.

FIG. 2B represents an example of the vehicle slip state when the braking force is applied to a two-wheel-drive vehicle or a four-wheel-drive vehicle, especially the one with relatively weak front-rear binding force of the vehicle on the road with a relatively low friction coefficient $\mu$. In this case, both the front and rear wheels are in the slip state. As there is no restricting force or weak restricting force applied to the front and the rear wheels, the wheel speed difference between the front and rear wheels is generated (VWf<VWr). The estimated vehicle speed VB is equal to the highest wheel speed, that is, the rear wheel speed VWr. Meanwhile, as both the front and rear wheels are in the slip state, the deceleration of the actual vehicle speed V0 is relatively low, resulting in the relationship of VWf<VWr=VB<<V0. When the rear wheel speed VWr becomes zero, that is, VWr=0, all the four wheels are brought into the lock state.

FIG. 2C represents another example of the vehicle slip state when the braking force is applied to the four-wheel-drive vehicle, especially the one with relatively strong front-rear binding force of the vehicle on the road with a relatively low friction coefficient $\mu$. In this case, both the front and the rear wheels are in the slip state. As the restricting force applied to the front and rear wheels is strong, there is substantially no difference in the wheel speed between the front and rear wheels (VWf=VWr). The estimated vehicle speed VB is equal to the wheel speed VWf or VWr. Meanwhile, as both the front and rear wheels are in the slip state, the deceleration in the actual vehicle speed V0 is relatively low, resulting in establishment of the relationship of VWf=VWr=VB<<V0. When the front and the rear wheel speeds VWf and VWr become zero, that is, VWf=VWr=0, the four wheels are brought into the lock state.

The example in FIG. 2B shows the vehicle slip state of the two-drive-wheel vehicle or the four-drive-wheel vehicle, especially the one with relatively weak front-rear binding force. The example in FIG. 2C shows the vehicle slip state of the four-drive-wheel vehicle especially the one with relatively strong front-rear binding force. It is to be understood that the invention is not limited to be applied to the aforementioned forms. The slip state of the vehicle shown in FIG. 2B or 2C may take an arbitrary form depending on the condition of the road surface (friction coefficient $\mu$, gradient of the road and the like), or the condition of the vehicle (braking force, speed, weight distribution and the like) irrespective of the drive type of the vehicle.

Figure 3:
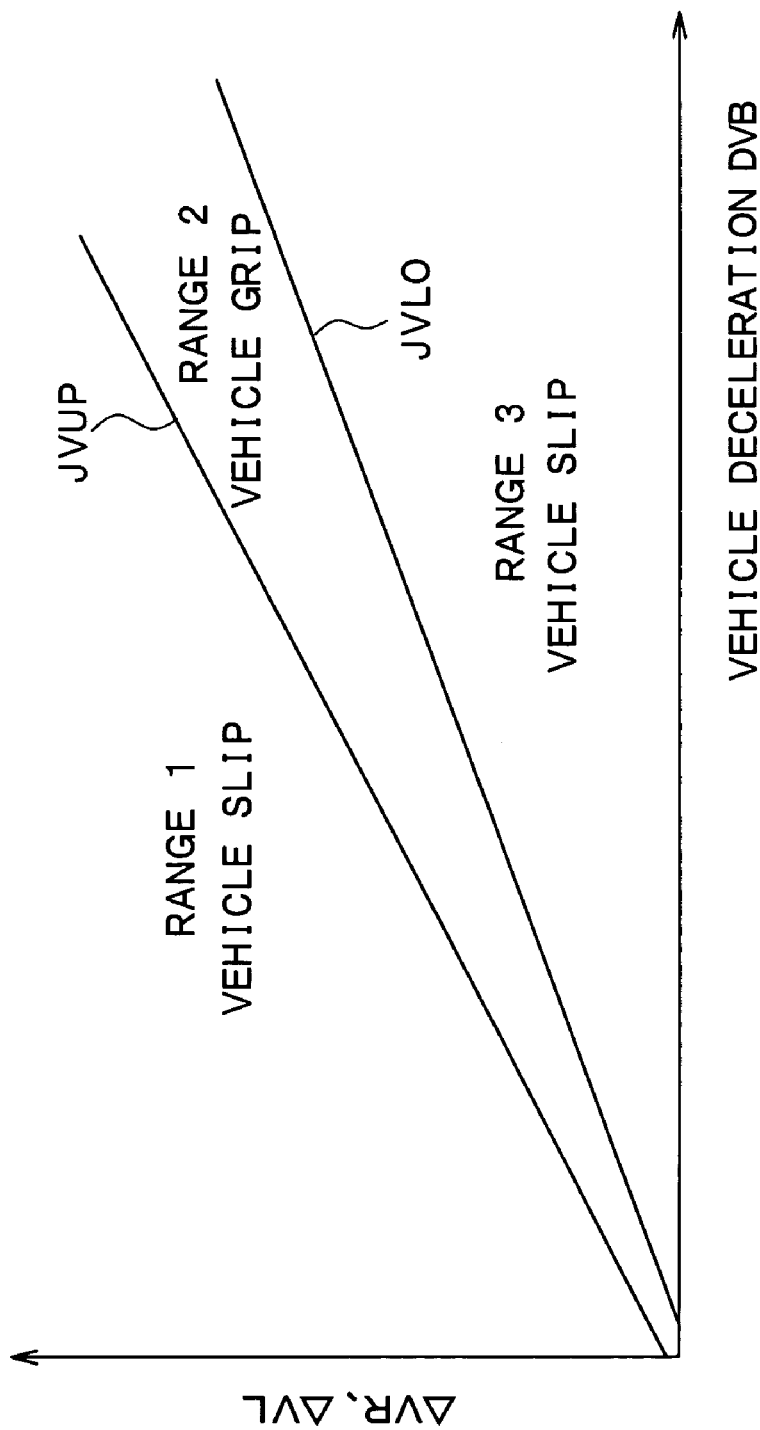
FIG. 3 is a view that represents a relationship between the estimated vehicle deceleration of the vehicle speed and the difference in the wheel speed between the front and the rear wheels.

FIG. 3 shows the aforementioned vehicle slip state and the vehicle grip state in accordance with various road surface conditions and the vehicle states.

Referring to FIG. 3, the axis of abscissas represents the estimated vehicle deceleration DVB, and the axis of ordinates represents the wheel speed difference between the right front and rear wheels, and between the left front and rear wheels, that is, $\Delta$VR, $\Delta$VL, respectively. The estimated vehicle deceleration DVB is the amount of change in the estimated vehicle speed VB with respect to time, that is, derivative value, on the assumption that the estimated vehicle speed changes during deceleration at a time gradient within a predetermined range.

As shown in the graph of FIG. 3, each relationship between the estimated vehicle deceleration DVB and the wheel speed difference between the right front and rear wheels ($\Delta$VR), and between the estimated vehicle deceleration DVB and the speed difference between the left front and rear wheels ($\Delta$VL) is divided into three ranges, that is, the range 1 corresponding to the vehicle slip state as shown in FIG. 2B, the range 2 corresponding to the vehicle grip state shown in FIG. 2A, and the range 3 corresponding to the vehicle slip state shown in FIG. 2C. When the estimated vehicle deceleration DVB and the wheel speed difference $\Delta$VR or $\Delta$VL fall in the ranges 1 and 3, all the four wheels of the vehicle are in the slip state. When the estimated vehicle deceleration DVB and the wheel speed difference $\Delta$VR or $\Delta$VL fall in the range 2, it may be determined that the front wheels are in the slip state and the rear wheels are in the grip state, for example.

The ranges 1 and 2 are separated by the line of the speed difference upper limit value JVUP as the threshold value that increases with the increase in the estimated vehicle deceleration DVB. Meanwhile the ranges 2 and 3 are separated by the line of the speed difference lower limit of the speed difference value JVLO as the threshold value that increases with the increase in the estimated vehicle deceleration DVB. Those upper limit value JVUP and lower limit value JVLO (JVLO<JVUP) may be represented as a linear function value with respect to the estimated vehicle deceleration DVB approximately.

The upper limit value JVUP is derived from the value corresponding to the maximum value among values of the small difference between the front wheel speed VWf and the rear wheel speed VWr. The lower limit value JVLO is derived from the value corresponding to the minimum value among values of the small difference between the front wheel speed VWf and the rear wheel speed VWr.

Referring to FIG. 3, the upper limit value JVUP and the lower limit value JVLO are set as linear function values with respect to the estimated vehicle deceleration DVB under the braking state such that the range defined by those upper limit value JVUP and the lower limit value JVLO is set as the determination range. It is determined whether the relationship between the estimated vehicle deceleration DVB and the wheel speed difference between the right front and rear wheels $\Delta$VR or the relationship between the estimated vehicle deceleration DVB and the wheel speed difference between the left front and rear wheels $\Delta$VL falls within the determination range. If the relationship between the estimated vehicle deceleration DVB and the wheel speed difference between right front and rear wheels $\Delta$VR or the left front and rear wheels $\Delta$VL falls in the determination range, it is not possible to determine whether the rear wheels are in the grip state while traveling on the road with the friction coefficient $\mu$ at the middle or higher level, or both the front and the rear wheels are in the slip state while traveling on the road with the low friction coefficient $\mu$. It may be determined that both the front and the rear wheels, that is, all the four wheels are in the slip state when the relationship is in the range other than the determination range. In other words, it may be determined that the strong braking force is applied to the road with the lower friction coefficient μ, which may bring the front and the rear wheels into the slip state.

The vehicle of the same drive type may be brought into the vehicle slip state in the range 1 or in the range 3 as shown in FIG. 3 depending on the change in the condition, for example, braking condition and the like. The logic for the aforementioned determination makes it possible to execute the determination with respect to the vehicle slip state for any type of the vehicle including the two-wheel-drive vehicle, four-wheel-drive vehicle with either weak or strong front-rear binding force.

Based on the thus determined slip state, the brake fluid pressure is adjusted so as to detect the change in the slip state. Then how to change the slip state is detected and the braking operation is controlled to realize the required braking distance, thus controlling the traveling state. Thereafter, the normal ABS control may further be executed in accordance with the road surface with the low friction coefficient μ.

The determination with respect to the slip state and the ABS control executed by the ECU 11 will be described referring to the flowchart of FIG. 4 that represents the main routine. The routine starts upon turning of an ignition switch (not shown) ON.

Figure 4:
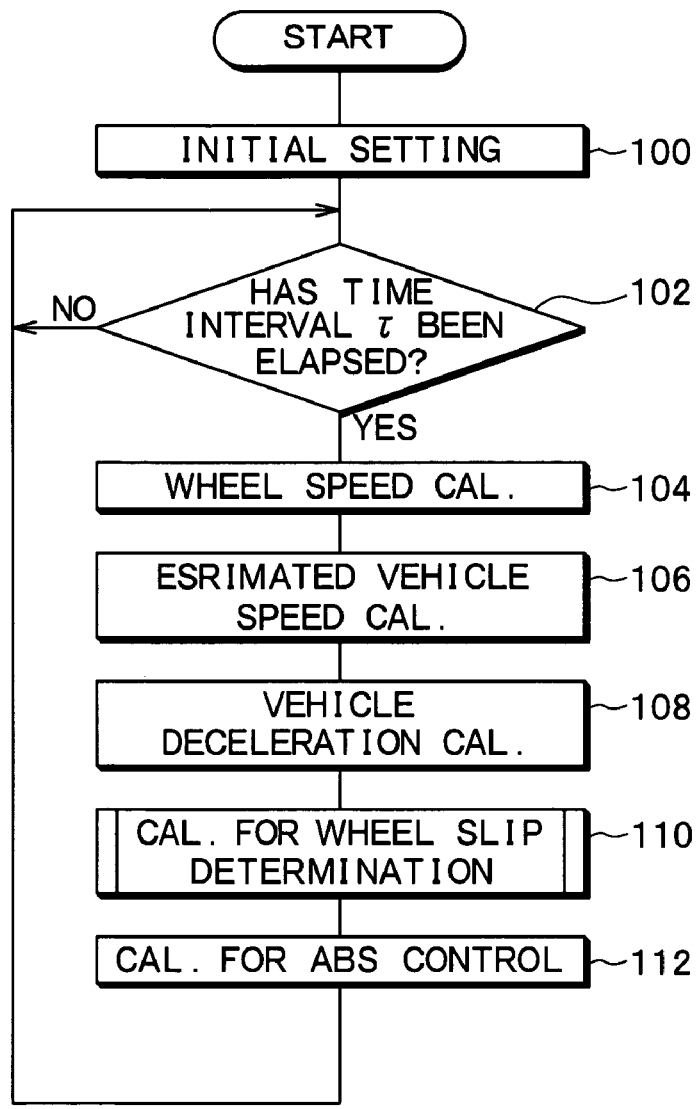
FIG. 4 is a flowchart that represents a main routine of the embodiment.

Referring to the flowchart of FIG. 4, at 100, initial setting with respect to various flags and counters is executed. Then at 102, it is determined whether an operation time interval τ as the operation cycle (τ=8 ms, for example) has elapsed using a timer. If it is determined that the time interval τ has elapsed, the process proceeds to the processing at 104.

At 104, each wheel speed VWFL, VWRR, VWFR, and VWRL corresponding to the left front wheel FL, right rear wheel RR, right front wheel FR, and left rear wheel RL, respectively is calculated based on detection signals of the respective wheel speed sensors 71 to 74. Then at 106, the wheel speed as the highest value selected among those of VWFL, VWRR, VWFR, and VWRL is set as the estimated vehicle speed VB(n). The n refers to the frequency of the executed operation.

At 108, the estimated vehicle deceleration DVB(n) is obtained as the amount of change from the previous estimated vehicle speed VB(n−1) to the present estimated vehicle speed VB (n) with respect to time based on equation 1 as below.

$$DVB(n)=-(VB(n)-VB(n-1))/\tau \quad \text{(Equation 1)}$$

At 110, the determination is made with respect to the slip state of the vehicle based on each of the wheel speeds VWFL, VWRR, VWFR, VWRL, and the estimated vehicle deceleration DVB. At 112, the target braking force to be applied to each of the wheels is calculated for the purpose of executing the ABS control if it is determined that the vehicle is in the slip state.

Figure 5:
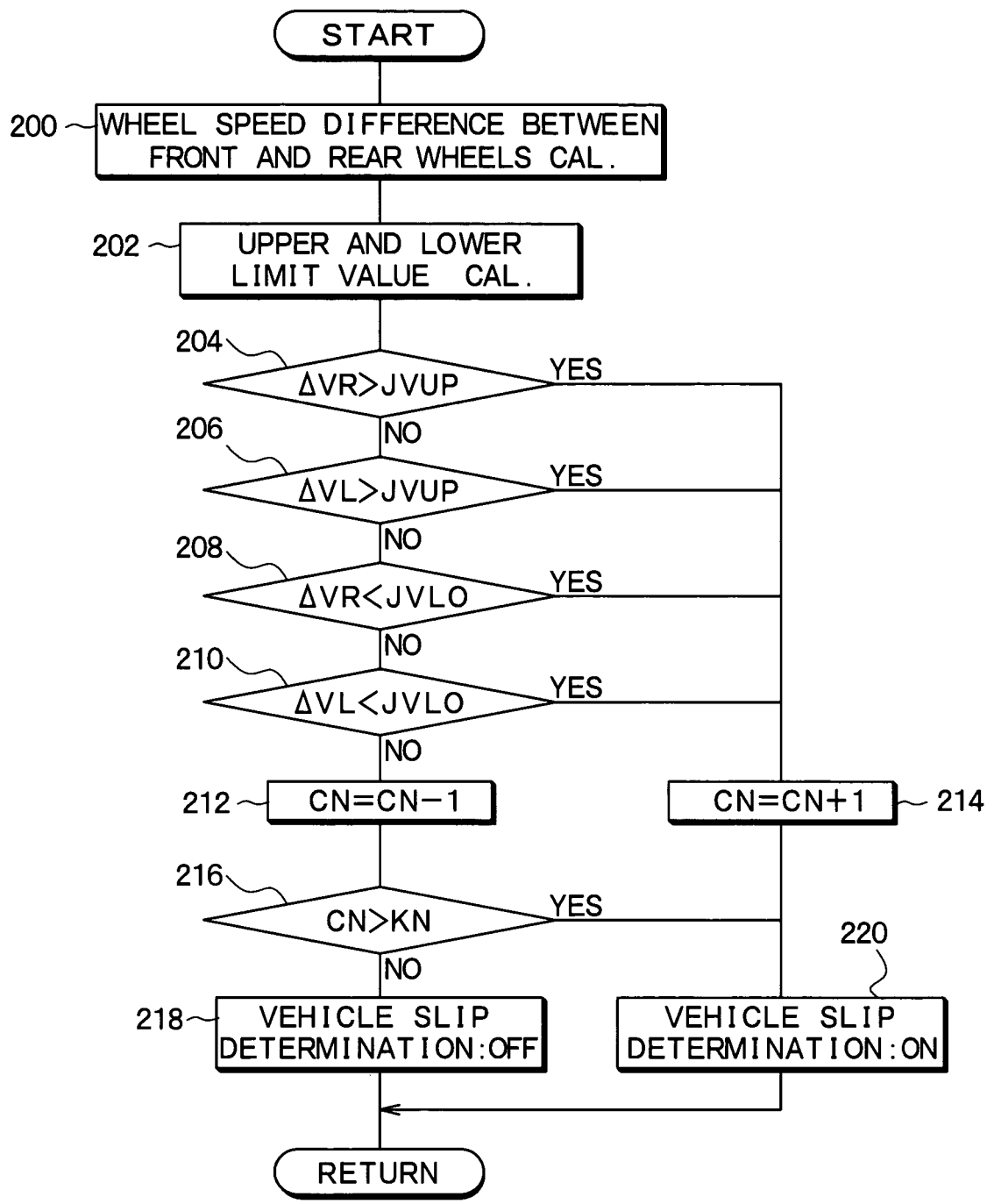
FIG. 5 is a flowchart that represents a sub-routine for making a determination with respect to the slip state of the vehicle.

The calculation for making the determination with respect to the slip state at 110 will be described referring to the flowchart of FIG. 5. At 200, the wheel speed difference between the right front and rear wheels ΔVR and the wheel speed difference between the left front and rear wheels ΔVL are calculated using the following equation 2.

$$\Delta VR=|VWFR-VWRR|$$

$$\Delta VL=|VWFR-VWRR| \quad \text{(Equation 2)}$$

At 202, the upper limit value JVUP and the lower limit value JVLO are calculated using equation 3 for the purpose of determining the vehicle grip state with respect to the present estimated vehicle deceleration DVB.

$$JVUP=KU \cdot DVB+CU$$

$$JVUP=KU \cdot DVB-CL \quad \text{(Equation 3)}$$

where the unit of the estimated vehicle deceleration DVB is G, KU and KL are constants (for example, 2 and 0.5, respectively), and CU and CL are constants (for example, 2 km/h and 0.1 km/h, respectively). If JVLO<0, the relationship of JVLO=0 (km/h) is established.

At 204, it is determined whether the wheel speed difference between the right front and rear wheels ΔVR exceeds the upper limit value JVUP. If YES is obtained, the process proceeds to the processing at 214. If NO is obtained, the process proceeds to the processing at 206.

At 206, it is determined whether the wheel speed difference between left front and rear wheels ΔVL exceeds the upper limit value JVUP. If YES is obtained, the process proceeds to the processing at 214. If NO is obtained, the process proceeds to the processing at 208.

At 208, it is determined whether the wheel speed difference between right front and rear wheels ΔVR is smaller than the lower limit value JVLO. If YES is obtained, the process proceeds to the processing at 214. If NO is obtained, the process proceeds to the processing at 210.

At 210, it is determined whether the wheel speed difference between left front and rear wheels ΔVL is smaller than the lower limit value JVLO. If YES is obtained, the process proceeds to the processing at 214. If NO is obtained, the process proceeds to the processing at 212.

At 212, the counter value CN is decremented by 1. At 214, the counter value CN is incremented by 1. When it is determined that the counter value CN exceeds a predetermined value KN at 216, it is determined that the vehicle is in the slip state at 220. The determination with respect to the vehicle slip state is kept OFF until the counter value CN exceeds the predetermined value KN at 218. The minimum value of the counter value CN is fixed to zero so as not to become the negative value. If the vehicle grip state is continued during traveling of the vehicle, the counter value CN is held zero at 212.

When it is determined that the wheel speed difference between right front and rear wheels or between left front and rear wheels is in the range other than that defined by the speed difference upper limit and the lower limit in 204 to 210 executed at an operation time interval τ, the counter value CN is incremented. When it is determined that the speed difference between right front and rear wheels or between left front and rear wheels is in the determination range as aforementioned, the counter value CN is decremented.

The counter value CN corresponds to the difference between operation frequency at which the wheel speed difference between the right or left front and rear wheels ΔVL or ΔVR deviates from the determination range, and another operation frequency at which those values ΔVL and ΔVR are within the determination range.

It is determined that the vehicle is in the slip state when the counter value CN exceeds the predetermined value KN. In the case where the wheel speed difference between front and rear wheels changes owing to the change in the road surface condition or braking state of the vehicle, and such difference in the wheel speed falls in the determination range only once, the slip state of the vehicle cannot be determined. Accordingly, the present invention makes it possible to make a determination with respect to the slip state reliably.

Figure 6:
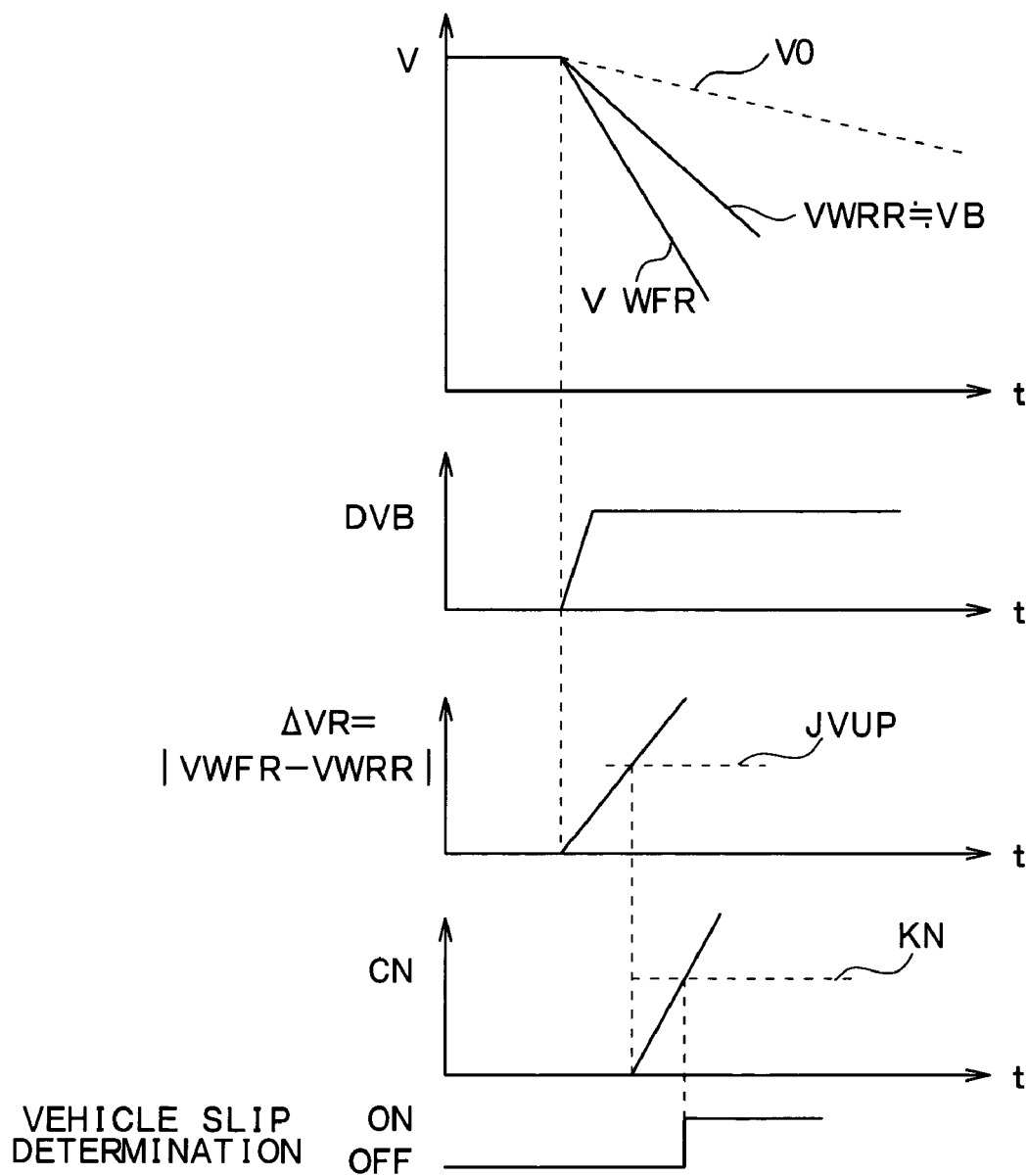
FIG. 6 is a view that shows an example of the determination with respect to the slip state of the vehicle according to the embodiment of the present invention.

An example of the determination with respect to the slip state of the vehicle will be described hereinafter. FIG. 6 shows the timing charts with respect to parameters each representing the example of the determination of the slip state in the range 1 shown in FIG. 3. FIG. 6 shows the example using the wheel speeds VWFR, VWRR of the right front and rear wheels. In the range 1, the difference in the wheel speed between the front and rear wheels resulting from the braking operation becomes large (VWFR<VWRR), and the relationship of the estimated vehicle speed VB≈right rear wheel speed VWRR<<actual vehicle speed V0 is established. Each of those parameters decreases as passage of time. If the wheel speed difference between right front and right rear wheels ΔVR=|VWFR−VWRR| increases to exceed the upper limit value JVUP calculated in accordance with the estimated vehicle deceleration DVB, the counter value CN is counted up. The counter value CN is continuously counted up so long as the value ΔVR exceeds the upper limit value JVUP. When the counter value CN exceeds the predetermined value KN, it is determined that the vehicle is in the slip state and the determination flag becomes ON. When the counter value CN is counted up to exceed the predetermined value KN before four wheels are brought into the lock state, the determination with respect to the slip state may be made.

Figure 7:
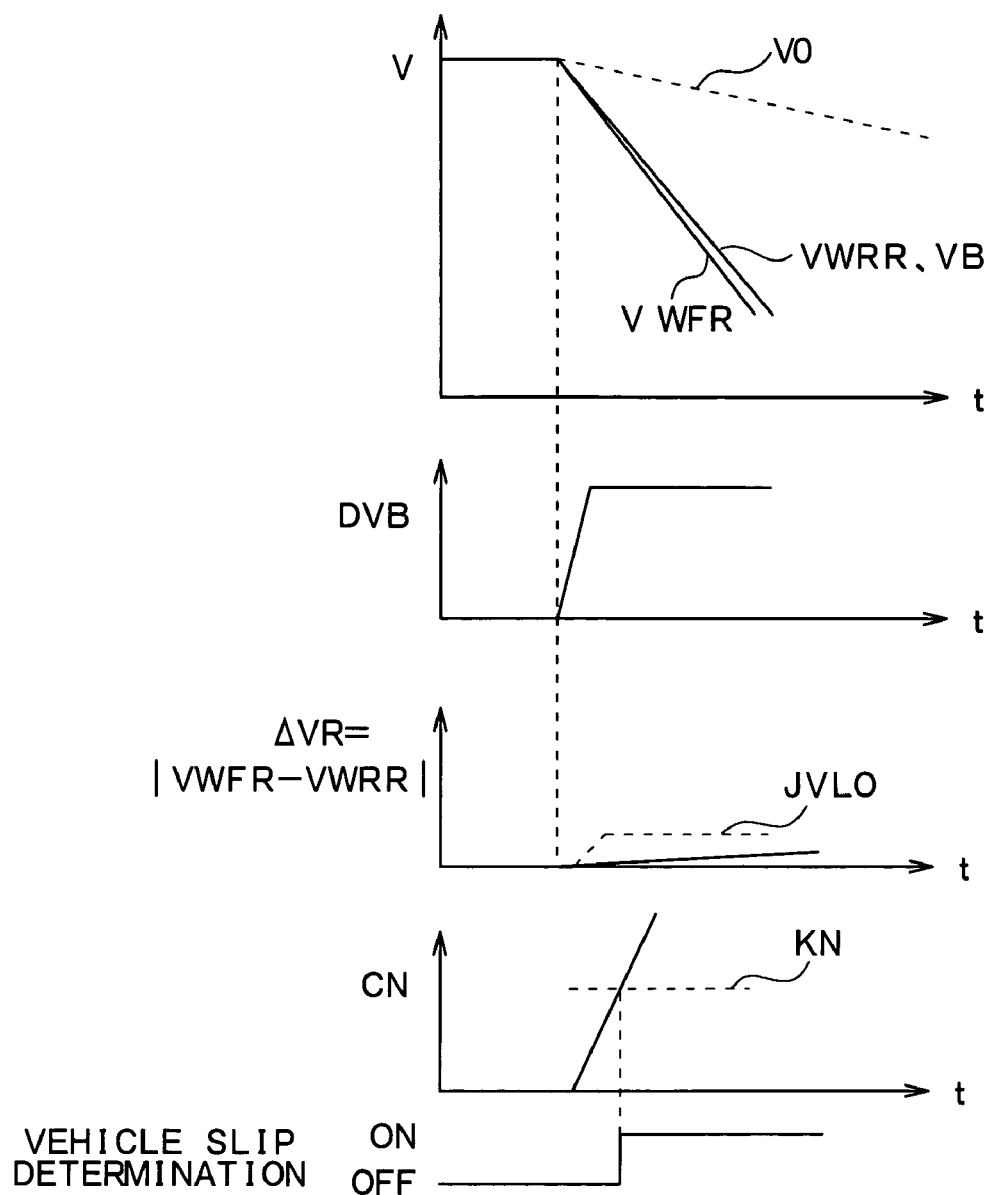
FIG. 7 is a view that shows an example of the determination with respect to the slip state of the vehicle according to the embodiment of the present invention.

FIG. 7 shows the timing charts with respect to parameters each representing another example of the determination of the slip state in the range 3 shown in FIG. 3. FIG. 7 shows the example using the wheel speeds VWFR, VWRR of the right front and right rear wheels. In the range 3, the wheel speed difference between the right front and rear wheels resulting from the braking operation becomes considerably small (VWFR≈ or <VWRR), and the relationship of the estimated vehicle speed VB≈right rear wheel speed VWRR<<actual vehicle speed V0 is established. Each of those parameters decreases with passage of time. The difference in the wheel speed between right front and rear wheels ΔVR=|VWFR−VWRR| is so small that it does not exceed the lower limit value JVLO that has been calculated in accordance with the estimated vehicle deceleration DVB. Accordingly the counter value CN is continuously counted up to be increased so long as the value ΔVR is smaller than the lower limit value JVLO. When the counter value CN exceeds the predetermined value KN, it is determined that the vehicle is in the slip state and the determination flag becomes ON. When the counter value CN is counted up to exceed the predetermined value KN before four wheels are locked, the determination with respect to the slip state may be made.

OTHER EMBODIMENT

In the aforementioned embodiment, the upper and lower limit values of the determination range are set in accordance with the estimated vehicle deceleration as the deceleration of the vehicle speed which has been calculated as a parameter indicating the braking state. However, they may be set in accordance with the deceleration in the wheel speed. The wheel deceleration DVW may be obtained as the amount of change in the previous wheel speeds VWFR(n−1), VWRR(n−1) with respect to time as being represented by the equation 1. The wheel speeds VWFR, VWRR substantially correspond to the estimated vehicle speed VB. Accordingly the deceleration in the wheel speed DVW may be regarded as being substantially equal to the estimated vehicle deceleration DVB.

The vehicle slip determination system in the aforementioned embodiment is applicable to the vehicle of any drive type including two-wheel-drive vehicle (front-wheel-drive or rear-wheel-drive), and four-wheel-drive vehicle having strong or weak binding force applied between the front and rear wheels.

In the aforementioned embodiment, the ABS control is executed under the vehicle slip state which has been determined by the ECU 11 as the vehicle slip determination system. However, traction control may also be executed for increasing the braking force for the drive wheels so as to prevent the drive wheels from being brought into the slip state.

While the above description is of the preferred embodiments of the present invention, it should be appreciated that the invention may be modified, altered, or varied without deviating from the scope and fair meaning of the following claims.

What is claimed is:

1. A vehicle slip state determination system comprising:
a wheel speed detection unit for detecting a wheel speed of each wheel of the vehicle;
a calculation unit for calculating a wheel speed difference between front and rear wheels based on the detected wheel speed;
a condition set unit for setting a lower limit value of the wheel speed difference in accordance with a braking state of the vehicle, and sets a range defined by a value equal to or larger than the lower limit value as a condition determination range; and
a slip determination unit for determining a slip state of the vehicle when the wheel speed difference deviates from the set condition determination range.

2. The vehicle slip state determination system according to claim 1, further comprising a vehicle speed calculation unit for calculating a vehicle speed based on each of the detected wheel speed, and a deceleration calculation unit for calculating deceleration in the vehicle speed under a braking control based on a change in the vehicle speed with respect to time, wherein the condition set unit sets the lower limit value in accordance with the obtained deceleration.

3. The vehicle slip state determination system according to claim 2, wherein the condition set unit increases the lower limit value in accordance with an increase in the obtained deceleration.

4. The vehicle slip state determination system according to claim 3, wherein the condition set unit sets the lower limit value as a linear function value with respect to the obtained deceleration.

5. The vehicle slip state determination system according to claim 1, wherein the condition set unit further sets an upper limit value of the wheel speed difference that is larger than the lower limit value in accordance with the braking state, and the condition determination range is set between the upper limit value and the lower limit value.

6. The vehicle slip state determination system according to claim 5, wherein the condition set unit increases the upper limit value in accordance with an increase in the obtained deceleration.

7. The vehicle slip state determination system according to claim 6, wherein the condition set unit sets the upper limit value as a linear function value with respect to the obtained deceleration.

8. The vehicle slip state determination system according to claim 2, wherein the condition set unit further sets an upper limit value of the wheel speed difference that is larger than the lower limit value in accordance with the braking state, and the condition determination range is set between the upper limit value and the lower limit value.

9. The vehicle slip state determination system according to claim 8, wherein the condition set unit increases the upper limit value in accordance with an increase in the obtained deceleration.

10. The vehicle slip state determination system according to claim 9, wherein the condition set unit sets the upper limit value as a linear function value with respect to the obtained deceleration.

11. The vehicle slip state determination system according to claim 1, wherein the calculation unit calculates the wheel speed difference between left front and rear wheels, and the wheel speed difference between right front and rear wheels, respectively at a predetermined time interval, and wherein the slip determination unit determines the slip state of the vehicle when a difference between an operation frequency and another operation frequency exceeds a predetermined value, the operation frequency representing a frequency of operations in which at least one of the wheel speed difference between the left front and rear wheels and the wheel speed difference between the right front and rear wheels deviates from the condition determination range, and the another operation frequency representing a frequency of operations in which both the wheel speed differences between the left front and rear wheels, and the right front and rear wheels fall in the condition determination range.

12. The vehicle slip state determination system according to claim 2, wherein the calculation unit calculates the wheel speed difference between left front and rear wheels, and the wheel speed difference between right front and rear wheels, respectively at a predetermined time interval, and wherein the slip determination unit determines the slip state of the vehicle when a difference between an operation frequency and another operation frequency exceeds a predetermined value, the operation frequency representing a frequency of operations in which at least one of the wheel speed difference between the left front and rear wheels and the wheel speed difference between the right front and rear wheels deviates from the condition determination range, and the another operation frequency representing a frequency of operations in which both the wheel speed differences between the left front and rear wheels, and the right front and rear wheels fall in the condition determination range.

13. The vehicle slip state determination system according to claim 5, wherein the calculation unit calculates the wheel speed difference between left front and rear wheels, and the wheel speed difference between right front and rear wheels, respectively at a predetermined time interval, and wherein the slip determination unit determines the slip state of the vehicle when a difference between an operation frequency and another operation frequency exceeds a predetermined value, the operation frequency representing a frequency of operations in which at least one of the wheel speed difference between the left front and rear wheels and the wheel speed difference between the right front and rear wheels deviates from the condition determination range, and the another operation frequency representing a frequency of operations in which both the wheel speed differences between the left front and rear wheels, and the right front and rear wheels fall in the condition determination range.

14. The vehicle slip state determination system according to claim 1, wherein the condition set unit sets the condition determination range in accordance with the deceleration in the braking state.

15. The vehicle slip state determination system according to claim 1, wherein the vehicle comprises a four-wheel-drive vehicle.

* * * * *